United States Patent [19]

Spurr

[11] Patent Number: 4,784,819
[45] Date of Patent: Nov. 15, 1988

[54] METHOD OF INJECTION MOLDING OF PLASTIC PARTS UTILIZING AN ACCUMLATOR CHAMBER AND VALVE CHAMBER BETWEEN THE PLASTICIZER AND MOLD

[75] Inventor: Robert Spurr, West Hartford, Conn.

[73] Assignee: Fedders Machine & Tool Co., Inc., Londonderry, N.H.

[21] Appl. No.: 620,382

[22] Filed: Jun. 13, 1984

Related U.S. Application Data

[63] Continuation of Ser. No. 360,048, Mar. 19, 1982, abandoned.

[51] Int. Cl.⁴ .............................................. B29G 45/54
[52] U.S. Cl. ................................ 264/328.19; 425/560; 425/564
[58] Field of Search ...................... 264/328.17, 328.19; 425/555, 557, 558, 559, 560, 564

[56] References Cited

U.S. PATENT DOCUMENTS

| Re. 28,721 | 2/1976 | Farrell | 425/159 |
| 3,268,636 | 8/1966 | Angell | 264/328.19 |
| 4,124,308 | 11/1978 | Sokolow | 264/328.19 |
| 4,342,717 | 8/1982 | Gardner | 425/555 |

FOREIGN PATENT DOCUMENTS

| 53-37763 | 4/1978 | Japan | 425/558 |
| 912695 | 1/1961 | United Kingdom . | |

Primary Examiner—Jan H. Silbaugh
Assistant Examiner—Jill L. Heitbrink
Attorney, Agent, or Firm—Davis, Bujold & Streck

[57] ABSTRACT

A method of injection molding of plastic parts in a mold in continuing cycles including the plasticizing of a moldable plastic and injecting the moldable plastic into a mold cavity characterized in that after the mold cavity is charged with plastic, pressure is maintained on the mold through an accumulator, with the accumulator being completely purged and refilled during each cycle thereby avoiding having in the accumulator static or stale plastic.

3 Claims, 3 Drawing Sheets

METHOD OF INJECTION MOLDING OF PLASTIC PARTS UTILIZING AN ACCUMLATOR CHAMBER AND VALVE CHAMBER BETWEEN THE PLASTICIZER AND MOLD

This is a continuation of application Ser. No. 06/360,048 filed Mar. 19, 1982, now abandoned.

STATEMENT OF INVENTION

The present invention is directed to an injector nozzle valve and accumulator assembly comprising a barrel and plasticizing screw of the type conventionally used in simultaneously forming a plurality of parisons in a mold for subsequent stretch blowing into a container, such as a bottle. More particularly, the assembly is designed to provide a holding pressure on the mold cavity while the injector is plasticizing the next charge of plastic melt; to provide purging of the accumulator after each cycle and before recharging with fresh plastic melt, and to maintain a proper holding pressure on the mold cavity while adding material to the mold cavity to reduce mold part shrinkage, thereby maintaining uniform wall thickness and temperature within the wall of the formed part.

BACKGROUND OF INVENTION

In recent years substantial effort has been directed to the formation of plastic bottles as a partial replacement of glass bottles. This effort has built on knowledge that plastics, such as polyethylene terephthalate (PET), when molecularly stretched are tougher but lighter than glass; and on the glass art which describes both methods and apparatus for stretching and blowing glass in both the longitudinal and transverse directions.

For formation of the plastic container, it is necessary to start with a parison which is then heat-treated and stretch-blown into the plastic container. In the final plastic container, such as a bottle, it is desirable to have uniform wall thickness free of unsightly defects, both from the stand point of wall strength and visual appeal to the ultimate purchaser of the bottle. In order to obtain a bottle having uniform wall strength (thickness) free of unsightly defects, it is necessary to start with a substantially perfect parison. Accordingly, the parison cannot have variations in wall thickness or contain defects such as will be obtained if the parison mold used in forming the parison contains voids or is otherwise defective due to improperly filled molds, shrinkage in the mold, or the like. Moreover, in recent years the speed of formation of the parison, as well as the plastic bottles, has become critical in order to provide a viable commercial operation. This speed of operation requires the continuous formation of a plurality of parisons simultaneously, utilizing a single injection mechanism.

There are a substantial number of patents disclosing apparatuses for injection molding of a molding material which include an accumulator in the injection assembly. These apparatuses are designed and the intent is to obtain parts, such as parisons in a multi-cavity mold, which are free from defect and which provide parts having uniform wall thicknesses. However, all of the known injector nozzle valve and accumulator assemblies suffer disadvantages from the standpoint of speed and/or the defects in the formed parts caused by a failure of the accumulator cylinder to be purged completely after each operation, resulting in the injection of old plastic melt into the mold with subsequent operation resulting in wall defects and/or in not providing an adequate holding pressure on the mold cavity with the addition of new material. If there is no holding pressure, the mold cavity as a result of shrinkage can provide an article having non-uniform wall thickness, or the like, in the formed article.

OBJECTS AND SUMMARY OF INVENTION

Accordingly, the primary object of this invention is to provide an injector nozzle valve and accumulator assembly suitable for use in the continuous formation of a plurality of parts, such as parisons, simultaneously in a mold wherein the mechanical components of the assembly and its cyclic sequence of operation purges all material from the previous cycle from the assembly, and recharges the accumulator cylinder with fresh plastic material during the injector cycle, and then applies a holding pressure in conjunction with the injector screw pressure while the shut-off valve is closing thereby compensating for shrinkage and ensuring uniform wall thickness in the finished part.

In summary, the present invention provides an injector nozzle valve and accumulator assembly having a shut-off valve and a plastic accumulating cylinder between the injection mold and the discharge end of the plasticizing screw. The mold cavity into which the plastic is injected has a mold gate valve to provide for plastic flow shut-off. An air cylinder and piston actuates a rotary shut-off valve in the plastic flow stream immediately following the injector screw. Between the shut-off valve and the mold manifold is an accumulating cylinder and piston used to maintain pressure on the plastic in the mold during the hold pressure period when the plastic is shrinking and solidifying. The accumulating piston is actuated by a hydraulic cylinder to provide the necessary holding pressure. The accumulating cylinder has a displacement of approximately five (5%) percent of the total mold volume to compensate for plastic shrinkage. The accumulator piston end and mating cylinder head plug is of a configuration so as to expel all residual plastic from the cylinder when the piston has reached the bottom of the stroke, leaving only a passage for the plastic flow.

Accordingly, a basic feature of the present invention is the combination of the described mechanical components and the cyclic sequence in which the accumulator piston purges all material from the previous cycle and recharges the cylinder with fresh material during the injector cycle and then applies the holding pressure in conjunction with the injector screw pressure while the shut-off valve is closing. During this time the injector screw starts plasticizing the next charge of plastic melt while the accumulator piston is thrusting plastic melt into the mold cavity compensating for shrinkage. During this period the holding pressure ensures uniform wall thickness and uniform cooling of the plastic part to maintain uniform wall temperature. When the holding pressure period is completed, the accumulator piston is retracted and the plastic in the mold manifold is decompressed, thereby allowing the mold gate valve to close without encountering a resistive pressure.

According to the present invention, the holding and cure cycle for proper heat control is separated from the screw recovery cycle.

The assembly of the present invention permits the continuous formation of a plurality of articles such as parisons simultaneously in batches; the articles having uniform wall thicknesses without defects in the articles which would show in the ultimately formed article. In describing the inventron hereinafter, it will be in reference to the formation of parisons useful in bottle formation.

THE DRAWING AND DETAILED DESCRIPTION OF THE PREFERRED EMBODIMENT

Figure 1:
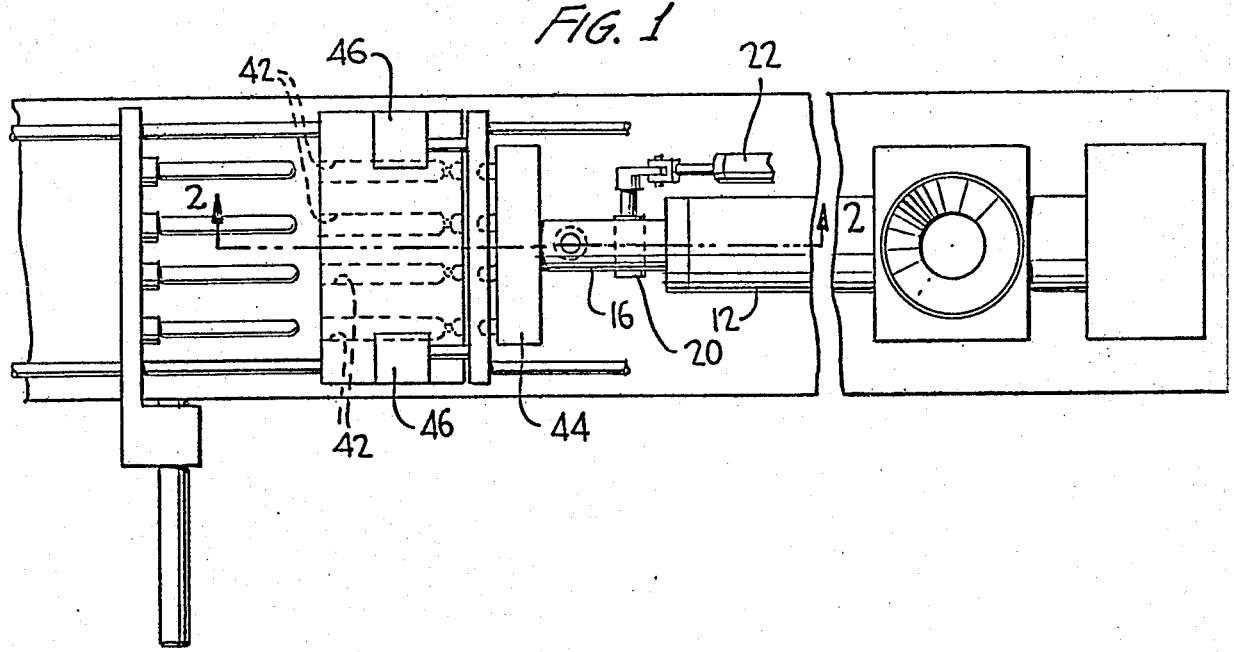
FIG. 1 is a perspective view, partly broken away, of an injection parison mold assembly employing the injector nozzle valve and accumulator assembly of the present invention.
Figure 3:
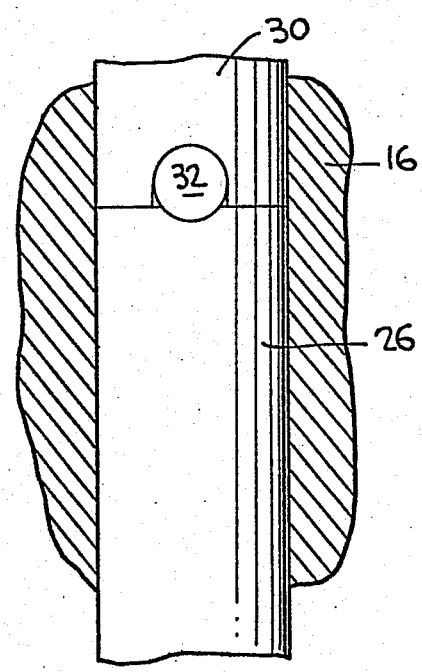
FIG. 3 is a sectional view taken along line 4—4 of FIG. 2 showing the accumulator piston at the full inward position.
Figure 4:
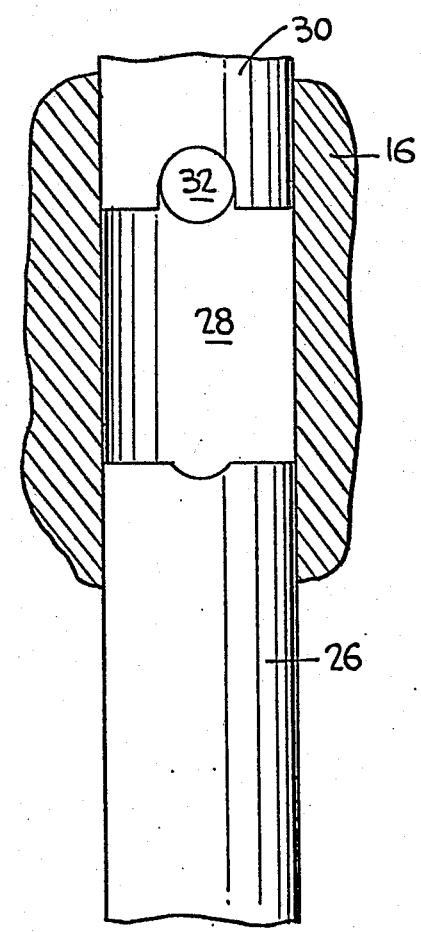
FIG. 4 is the same as FIG. 3 showing the accumulator piston in the retraction position.
Figure 2:
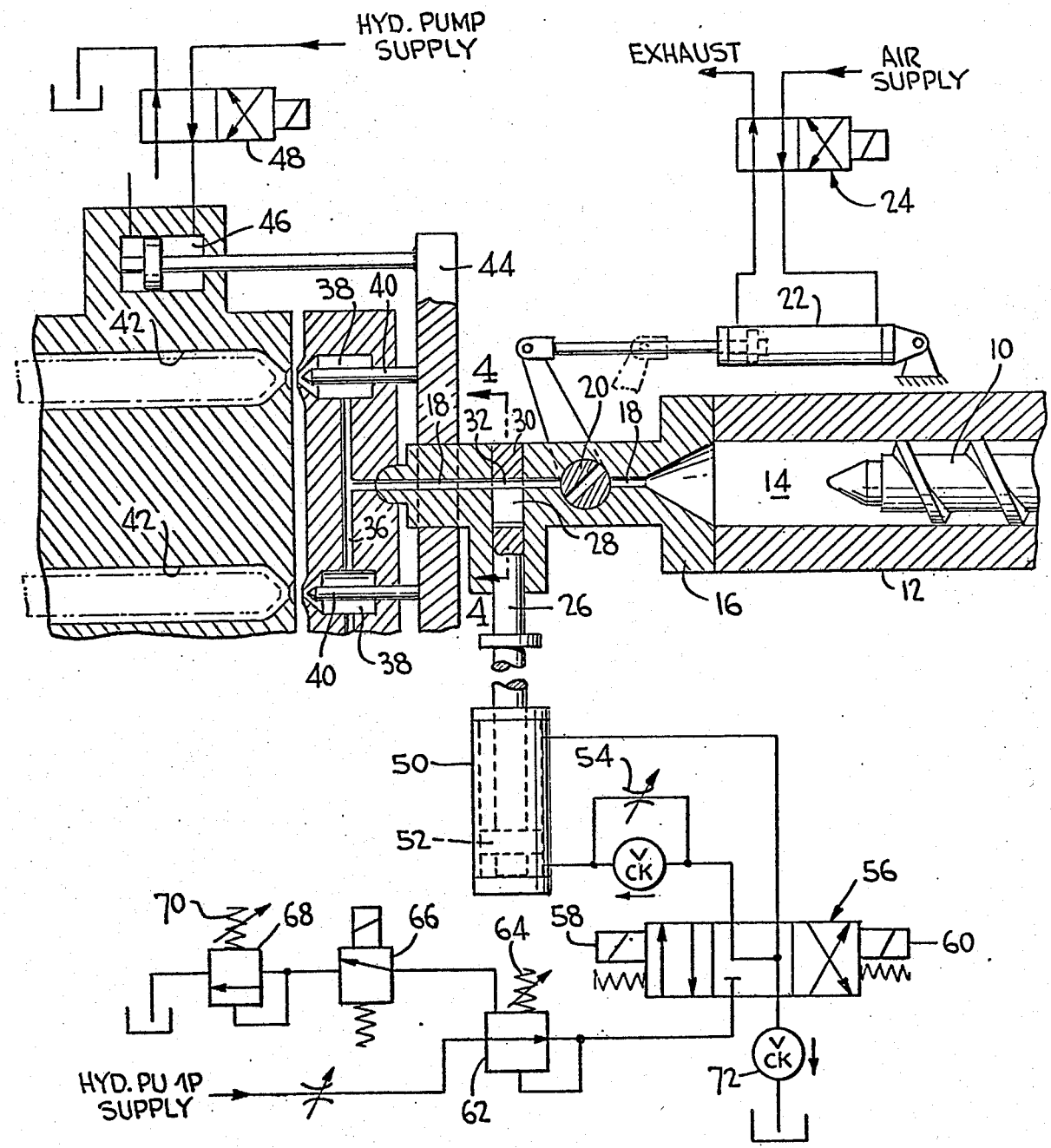
FIG. 2 is, in part, a cross-sectional view taken along line 2—2 of FIG. 1 of the injection system of the present invention and including, diagrammatically, the operating fluid system.

Referring to the drawing, the injection screw 10 rotated by a fluid motor and reciprocated by a fluid cylinder, not shown, operating in heated barrel 12 plasticizes the material in chamber 14. Attached to barrel 12 is heated nozzle body 16 having a passage 18 and a rotary shut-off valve 20 actuated by fluid motor 22 controlled by a solenoid operated air valve 24. Downstream of the rotary valve 20 is located accumulator chamber 28. The accumulator 28 is closed by cylinder head plug 30. Piston 26 and head plug 30 are shaped to form a passageway 32 when piston and head plug are in contact as shown in FIG. 3. The continuing transfer passage 18 conducts the plastic to the hot runner manifold via passage 36 to the valve chamber 38. Mold gate valve 40 controls the plastic flow into the mold cavity 42. The mold gate valve 40 is actuated by plate 44 and hydraulic cylinder 46 controlled by a solenoid operated valve 48.

Accumulator piston 26 is connected to and driven by the piston 52 operated by a hydraulic cylinder 50. The accumulator piston 26 outward travel velocity is controlled by the flow valve 54.

Directional control valve 56 operated by solenoid 58 directs piston 26 inward for the purge cycle and the hold pressure cycle. Solenoid 60 directs piston 26 outward during the de-compression cycle.

Pressure reducing valve 62 operates the purge pressure level by adjustment 64. Solenoid valve 66 when operated causes the reducing valve 62 to be controlled by pressure release valve 68 using adjustment 70 to set the level for the hold pressure. Check valve 72 prevents fluid drain from the system during the accumulator piston refill cycle.

Figure 5:
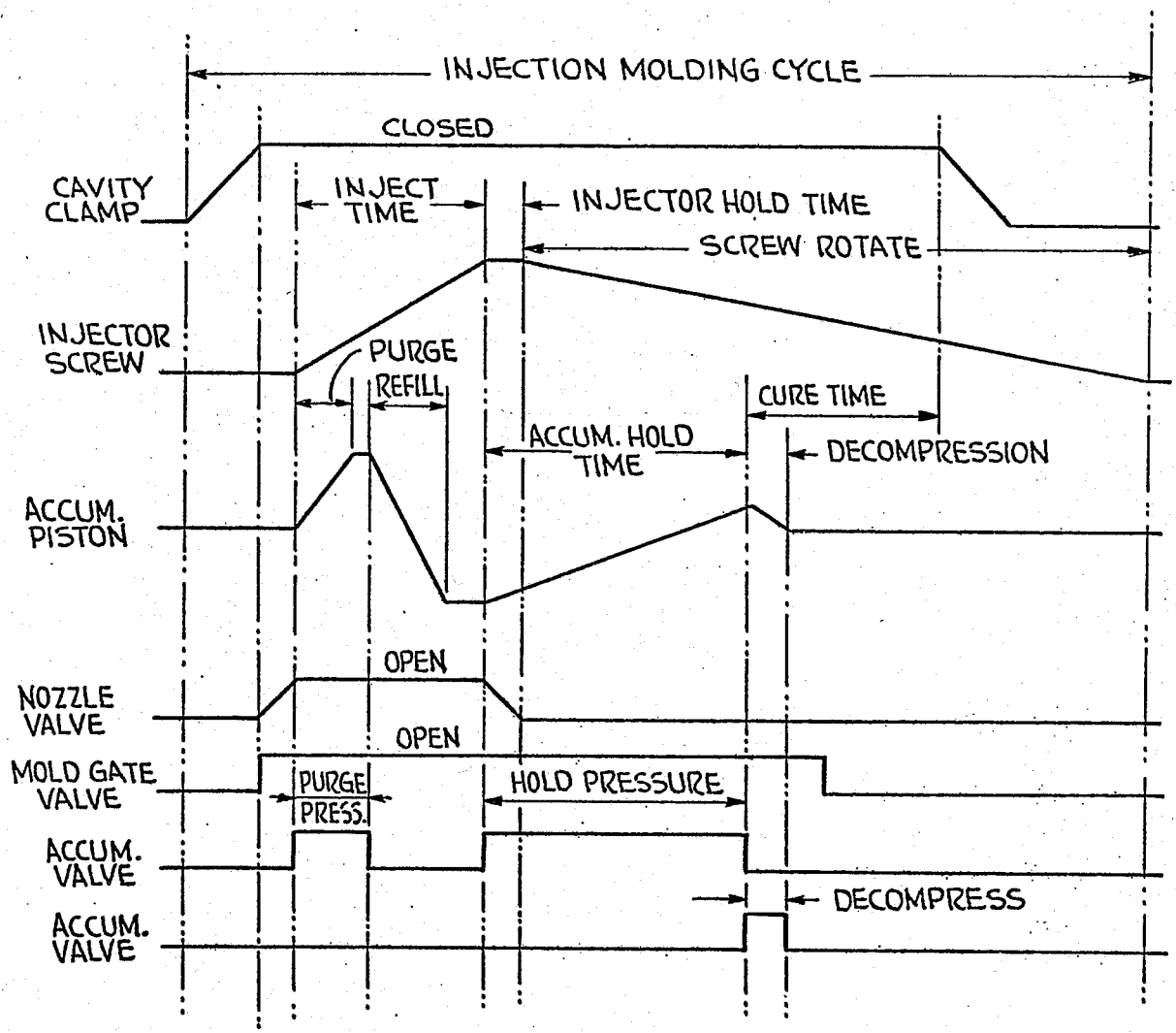
FIG. 5 is a timing sequence diagram for the injection molding cycle.

The assembly operates in accordance with the timing sequence diagram shown in FIG. 5 which demonstrates sequential operation of the assembly. At the injection cycle start, the injector screw 10 has plasticized the material in chamber 14. Passages 18 and 36, and chamber 38 are filled with plastic. Mold gate valve 40 is closed.

When the mold cavity 42 is closed, the nozzle valve 20 and mold gate valve 40 are opened by their respective actuators.

The injector screw 10 propels the plastic through the passages into the cavity 42. Simultaneously, the accumulator piston 26 thrusts inward directed by valve 56 and solenoid 58 at a pressure set on reducing valve 62 purging the residual plastic from chamber 28. When the accumulator piston 26 contacts head plug 30, the plastic then flows through passage 32 flushing out residual material.

De-energization of solenoid 58 allows directional valve 56 to return to center position which allows plastic to refill the accumulator chamber 28, causing piston 52 to move outward at a rate controlled by flow valve 54. At the termination of the injection cycle, the plastic has been expelled from chamber 14, filling accumulator 28 and cavity 42. At this point the directional valve 56 operated by solenoid 58 permits the holding pressure to be applied by operation of valve 66 and pressure release valve 68. The cavity is now under pressure from both injector screw 10 and accumulator piston 26. The rotary shut-off valve 20 is returned to the closed position, allowing the injector screw to rotate and plasticize the next charge.

The accumulator piston 26 continues to apply the holding pressure on the plastic compensating for volumetric shrinkage within the mold cavity 42 to maintain uniform wall thickness and temperature control of the plastic article. At the termination of the accumulator hold time, directional valve 56 controlled by solenoid 60 retracts pistons 52 and 26, decompressing the plastic in valve chamber 38. The mold gate valve 40 is now closed operating against minimum plastic resistance. At the completion of the cured time determined by the temperature of the plastic article, the mold cavity is opened for removal of the article. The injector screw rotation may continue during the mold open period until the plasticizing requirements have been met.

The advantages of the assembly of the present invention include the following:

(1) The assembly permits the accumulator piston to provide the holding pressure while the injection screw rotation is plasticizing the next charge. This allows for longer plasticizing time, producing less material shear and heat due to a lower screw rotation rate with less power required for screw torque.

(2) The accumulator cylinder is purged and then recharged with fresh plastic melt on each cyclic operation to ensure that residual material does not remain in the system.

(3) The assembly maintains proper holding pressure and by constantly adding material to the mold cavity reduces the mold part shrinkage, thereby maintaining uniform wall thickness and temperature within the wall.

(4) The mold cure time is determined by the residual heat of the wall and, therefore, the plastic part must be removed at a precise time from the mold. This time period is not limited or governed by the plasticizing cycle.

(5) The assembly is beneficial in applications where the part temperature must be controlled to permit the next succeeding operation of the plastic part such as forming and conditioning a parison prearatory to a sequential blow forming cycle. Other advantages of the system flow from the overall design including its simplicity of construction and operation.

It will be apparent to one skilled in the art that modifications can be made within the hereinbefore described assembly. The preferred embodiment described is not to be construed as a limitation of the invention.

It is claimed:

1. A continuous method of injection molding of plastic parts in a mold which includes a cavity for molding said plastic parts and means for closing said mold comprising the steps of
   (1) plasticizing moldable plastic in plastic injection means including a barrel and an injection screw;
   (2) charging the plasticized plastic from said injection means into passage means connecting said injection means with the mold cavity and then into said mold cavity, said passage means including an operable and closable shut-off valve adjacent said barrel of said injection means wherein said shut-off valve is in an open position, accumulator means spaced from said shut-off valve toward said mold cavity including an accumulator chamber and control means for controlling the amount and pressure of plastic in said accumulator chamber;
   (3) purging said accumulator chamber completely of plastic simultaneously with the charging of plastic to said mold cavity and thereafter during said charging allowing said accumulator chamber to refill whereby said accumulator chamber is completely purged during each cycle;
   (4) closing said shut-off valve in said passage means adjacent said barrel of said injection means, and while maintaining plastic pressure on said mold cavity through said accumulator chamber and control means, plasticizing a second charge of plastic for injection into said mold cavity;
   (5) releasing the pressure on said mold cavity;
   (6) removing plastic parts from said mold, and
   (7) repeating said steps (2) through (6).

2. The method of claim 1 wherein said passage further includes a valve adjacent said mold cavity and said valve is closed when the plastic parts are removed from said mold.

3. The method of claim 2 wherein said valve is a gate valve and includes a valve chamber.

* * * * *